US011992808B2

(12) United States Patent
Ghaffour et al.

(10) Patent No.: US 11,992,808 B2
(45) Date of Patent: May 28, 2024

(54) MEMBRANE DISTILLATION MODULE AND MULTI-EFFECT PROCESS

(71) Applicant: KING ABDULLAH UNIVERSITY OF SCIENCE AND TECHNOLOGY, Thuwal (SA)

(72) Inventors: Noreddine Ghaffour, Thuwal (SA); Ahmad S. Alsaadi, Thuwal (SA); Lijo Francis, Thuwal (SA)

(73) Assignee: KING ABDULLAH UNIVERSITY OF SCIENCE AND TECHNOLOGY (SA)

( * ) Notice: Subject to any disclaimer, the term of this patent is extended or adjusted under 35 U.S.C. 154(b) by 136 days.

(21) Appl. No.: 17/260,661

(22) PCT Filed: Jul. 23, 2018

(86) PCT No.: PCT/IB2018/055477
§ 371 (c)(1),
(2) Date: Jan. 15, 2021

(87) PCT Pub. No.: WO2020/021303
PCT Pub. Date: Jan. 30, 2020

(65) Prior Publication Data
US 2021/0260532 A1    Aug. 26, 2021

(51) Int. Cl.
*B01D 61/36* (2006.01)
(52) U.S. Cl.
CPC ......... *B01D 61/364* (2013.01); *B01D 61/366* (2013.01); *B01D 2313/221* (2022.08); *B01D 2317/025* (2013.01)

(58) Field of Classification Search
CPC ................ B01D 61/364; B01D 61/366; B01D 2313/38; B01D 2317/025; B01D 2311/25; B01D 2313/36; B01D 61/06
See application file for complete search history.

(56) References Cited

U.S. PATENT DOCUMENTS

| 4,620,900 A | 11/1986 | Kimura et al. |
| 4,718,985 A * | 1/1988 | Kjellander ........... B01D 61/364 |
| | | 202/172 |

(Continued)

FOREIGN PATENT DOCUMENTS

WO    2016103029 A1    6/2016

OTHER PUBLICATIONS

Cheng, L.-H., et al., "Enhanced Air Gap Membrane Desalination by Novel Finned Tubular Membrane Modules," Journal of Membrane Science, May 20, 2011, vol. 378, pp. 398-406, Elsevier B.V.

(Continued)

*Primary Examiner* — Krishnan S Menon
(74) *Attorney, Agent, or Firm* — PATENT PORTFOLIO BUILDERS PLLC

(57) ABSTRACT

A membrane distillation module includes a housing having a hot inlet for receiving a hot feed and a hot outlet for expelling the hot feed; a porous membrane located inside the housing and having an outside surface that defines an enclosure, the outside surface being configured to contact the hot feed, wherein the porous membrane is configured to prevent the hot feed from passing from outside the porous membrane to an inside of the enclosure; and a non-porous conduit located inside the enclosure, the non-porous conduit having an inlet for receiving a cold feed and an outlet for expelling the cold feed.

12 Claims, 6 Drawing Sheets

(56) References Cited

U.S. PATENT DOCUMENTS

2011/0284443 A1  11/2011  Chen et al.
2017/0361277 A1  12/2017  Ghaffour et al.

OTHER PUBLICATIONS

International Search Report in corresponding/related International Application No. PCT/IB2018/055477, dated Jun. 21, 2019.
Invitation to Pay Additional Fees and, Where Applicable, Protest Fee and Annex to Form PCT/ISA/206 Communication Relating to the Results of the Partial International Search, dated Apr. 16, 2019.
Written Opinion of the International Searching Authority in corresponding/related International Application No. PCT/IB2018/055477, dated Jun. 21, 2019.
Substantive Examination Report in corresponding/related Saudi Arabian Application No. 521421081, dated Sep. 29, 2022.
Second Substantive Examination Report in corresponding/related Saudi Arabian Application No. 521421081, dated Sep. 7, 2023.

* cited by examiner

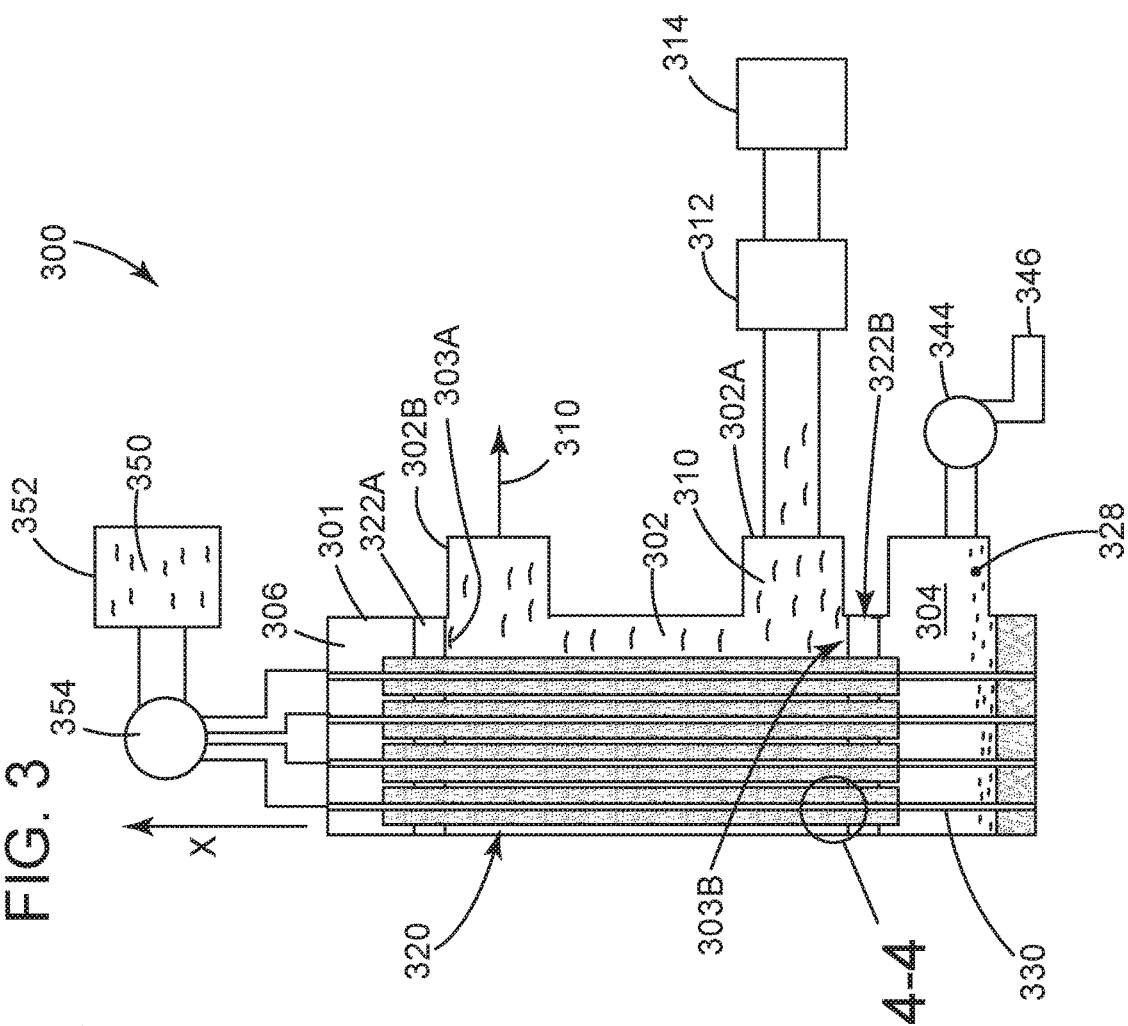
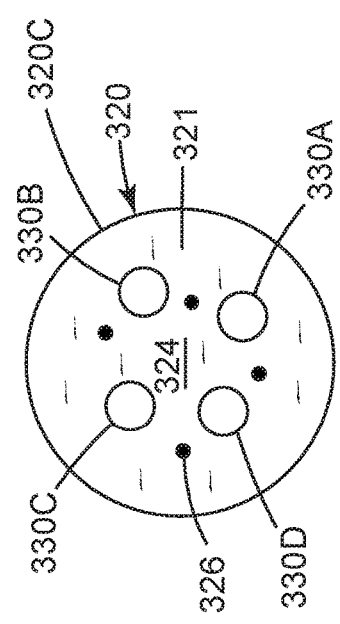

MEMBRANE DISTILLATION MODULE AND MULTI-EFFECT PROCESS

CROSS-REFERENCE TO RELATED APPLICATIONS

This application is a U.S. National Stage Application of International Application No. PCT/IB2018/055477, filed on Jul. 23, 2018, the disclosure of which is incorporated herein by reference.

BACKGROUND

Technical Field

Embodiments of the subject matter disclosed herein generally relate to methods and devices for separating water from a water feed, and more specifically, to seawater desalination technologies.

Discussion of the Background

There are currently two general categories of seawater desalinations technologies: thermal-based and membrane-based processes. Thermal-based desalination separates water from its impurities through evaporation and condensation. Membrane distillation (MD) is a thermally driven membrane-based separation process, considered as one of the technologies that are emerging as alternative desalination processes.

MD utilizes a hydrophobic, micro-porous membrane as a contactor to achieve separation by liquid-vapor equilibrium. A pre-heated feed solution is brought into contact with the membrane, which allows only the water vapor to go through the membrane pores so that it condenses on the other side of the membrane. This vapor is driven across the membrane by the difference in the partial vapor pressure maintained at the two sides of the membrane created by the difference of temperatures (feed/coolant).

Conventional desalination technologies such as multi-stage flash distillation (MSF) and reverse osmosis (RO) are not only highly energy intensive processes but they require huge investment cost and large footprint (including extensive pretreatment required for the RO process). The MD process operates at ambient pressure and lower temperatures (50-90° C.) so that any low-grade heat source (solar, waste heat and low-enthalpy geothermal) can be sufficient for its operation. Moreover the scalability, low-cost polymeric materials for the installation, and the very high salt rejection reaching 99.95% (theoretically 100%) regardless of the feed concentration, makes MD as an attractive alternative desalination process.

The current configurations that have been employed in MD processes are direct contact membrane distillation (DCMD), air gap membrane distillation (AGMD), vacuum membrane distillation (VMD) and sweeping gas membrane distillation (SGMD). In all configurations, a hot feed solution is in direct contact with the membrane. In DCMD, both hot and cold streams are in direct contact with the membrane. In AGMD, a stagnant air gap is maintained between the membrane and a condensation surface (the coolant flows in the external side of the condensation surface). Distilled water could also be filled in the air gap, known as liquid gap MD configuration. In VMD and SGMD, vacuum and a cold inert gas are passed through the permeate side, respectively, so that the vapor coming across the membrane from the feed is condensed outside the membrane module.

An example of a vacuumed gap membrane distillation (VAGMED) module 100 is now discussed with regard to FIG. 1, which corresponds to FIG. 1A of U.S. Patent Application Publication No. 2017/0361277 (the "'277 application" herein which is incorporated herein by reference). Module 100 includes one or more condensers 112A and 112B and at least one evaporator 117. The condensers 112A and 112B may include a passageway or conduit 113 allowing for a first feed stream 114, for example a cooling fluid, to pass through the condenser 112A. The cooling fluid can be a cold feed stream 114. The condenser 112A can include a condensation surface 115A. The condensation surface may be made of a metal, though other materials that allow efficient thermal conductivity for the cooling of the condensation surface 115A by the cold feed stream 113.

The evaporator 117 also includes a passageway or conduit 118 for allowing a second feed stream 119 to pass there through. The second feed stream can be a heated feed stream 119 or hot stream, e.g., natural geothermal spring or a discharge having high temperature which is enough to drive the process (direct multi-stage process) without a heat input. The evaporator 117 also includes an evaporation surface 121 on the exterior of the evaporator. The evaporation surface 121 can be designed or configured to allow condensable gas, for example water vapor, to pass out of the passageway 118 to the outside of the evaporator. The evaporation surface can be a porous membrane that allows water vapor to pass from the conduit 118 through the membrane and out of the evaporator 117.

The one or more condensers 112 can be positioned generally parallel or planar to the evaporators 117 and further spaced apart from evaporator 117 to provide one or more air gaps 123 between the condensation surface 115 of the one or more condensers 112 and the evaporation surface 121 of the evaporator 117. The one or more condensers 112, evaporator 117 and air gap(s) 123 can be contained within a compartment or housing 124. Evaporation and condensation can then take place inside the housing 124 of the module. The evaporation can produce condensable gases, such as water vapor, from the heated feed stream 119.

When in operation, a cold feed stream 114 enters the bottom of condenser 112A passing through passageway 113 of condenser 112A and exiting the top of the condenser to be cycled back to the top condenser 112B and passing there through to exit at the bottom of the second condenser 112B. The heated feed stream 119 can enter the top of evaporator 117 passing there through and exiting the bottom of the evaporator. The module, thus, provides counter-flow of the heated feed stream 119 in relation to the cold feed stream 114.

A multi-stage application of the above module is shown in FIG. 2, which corresponds to FIG. 3B of the '277 application. FIG. 2 shows three modules 250a, b, c fluidly connected in series for receiving a cold feed stream, for example, seawater. The cold feed stream 214 can first be passed through a de-gasifier or de-aerator to remove air and other gases from the stream. The cold feed stream 214 is then delivered to the cold stream inlet port 214a of a first module 250a. Each of the modules includes a heat exchanger or condenser 252 and an evaporator 257. The cold feed stream 214 enters the condenser 252a of module 250a passing there through to be delivered to condenser 252b of module 250b and from there on to condenser 252c of module 250c, where the cold feed stream 214 exits and is delivered to a heat exchanger 235. The cold feed stream 214 can be successively heated as it passes through the series of condensers 252 by the release of latent heat in each condenser due to the condensation of water vapor on the condensation surfaces.

The heat exchanger 235 heats the stream to provide a heated feed stream 219 and to promote production of condensable gases (e.g., water vapor). The heated feed stream 219 is delivered to evaporator 257c of module 250c, from thereon to evaporator 257b of module 250b and onto evaporator 257a of module 250a. Water vapor exits evaporators 257a, b, c through their respective evaporation surfaces into the respective air gaps of each of the modules where the water vapor condenses on the condensation surfaces of the respective condensers 252. Due to the loss of condensable gases from the series of evaporators 257, the heated feed stream 219 can be successively cooled as it passes from the heat exchanger 235 through the modules to become a brine discharge 237. The condensate from each module is collected and delivered, with the help of a pump 225, by way of a conduit 265, to a storage tank 267.

The heated feed stream 219 can exit the evaporator 257a of module 250a as concentrated brine solution 237 and can be delivered to brine storage tank 269. Ultimately, the concentrated brine solution 237 may be distributed further, as desired, by pump 271. Optionally, a portion of the brine solution 237 may be cycled or recirculated by conduit 273 back to be incorporated with the cold feed stream 214. Optionally, the brine solution 233 may pass through a heat exchanger 275 where it may be cooled by a cooling medium 277 and then delivered by conduit 279 to join the cold feed stream 214 for delivery to the condenser 252a of module 250a.

A vacuum system 245 can be configured to include a vacuum outlet port in module 250c where vacuum is drawn and delivered to vacuum inlet port of module 250b, which has a vacuum outlet port delivering vacuum to the vacuum inlet port of module 250a. Ultimately excess, uncondensed gases, for example uncondensed condensable gases (e.g., water vapor) and non-condensable gases, can be collected out of module 250a by the vacuum system 245. Some of the excess condensable gases may condense in the vacuum system which condensate may be delivered by conduit 268 to the condensate storage tank 267.

However, the current configurations are still not as energy efficient as desired and thus, there is a need to provide a new membrane distillation module that is easy to fabricate and more efficient in terms of water evaporation, and also a multi-effect process that more efficiently generates distilled water.

SUMMARY

According to an embodiment, there is a membrane distillation module that includes a housing having a hot inlet for receiving a hot feed and a hot outlet for expelling the hot feed, a porous membrane located inside the housing and having an outside surface that defines an enclosure, the outside surface being configured to contact the hot feed, wherein the porous membrane is configured to prevent the hot feed from passing from outside the porous membrane to an inside of the enclosure and a non-porous conduit located inside the enclosure, the non-porous conduit having an inlet for receiving a cold feed and an outlet for expelling the cold feed.

According to another embodiment, there is a method for obtaining a distillate with a membrane distillation module. The method includes a step of providing a hot feed outside a porous membrane, wherein the porous membrane prevents the hot feed to pass through the porous membrane inside an enclosure, a step of providing a cold feed to a non-porous conduit located inside the enclosure, the non-porous conduit having an inlet for receiving the cold feed and an outlet for expelling the cold feed, a step of evaporating water from the hot feed to form vapors, a step of condensing the vapors on the non-porous conduit to generate distilled water, and a step of collecting the distilled water.

According to still another embodiment, there is a distillation system for generating a distillate, the system including a first distillation module that receives a hot feed at an evaporation part; intermediate distillation modules that receive the hot feed from the first distillation module; and a last distillation module that receives the hot feed from the intermediate distillation modules. At least the first distillation module uses an output feed of the evaporation part as a coolant for a condensation part of the first distillation module.

According to still another embodiment, there is a method for obtaining a distillate with a distillation system. The method includes a step of receiving a hot feed at a first distillation module, a step of evaporating water from the hot feed at an evaporation part of the first distillation module, to form a vapor, a step of routing the hot feed exiting the evaporation part as a coolant, to a condensation part of the first distillation module, a step of condensing the vapor at the condensation part, and a step of supplying the coolant from the condensation part of the first distillation module to an intermediate distillation module for repeating the above steps.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 illustrates a membrane distillation module that uses a porous membrane that encompasses one or more conduits;

FIG. 4 illustrates how the one or more conduits are distributed inside the porous membrane;

FIG. 5 shows a cross-section through the porous membrane and the one or more conduits;

DETAILED DESCRIPTION

Figure 1:
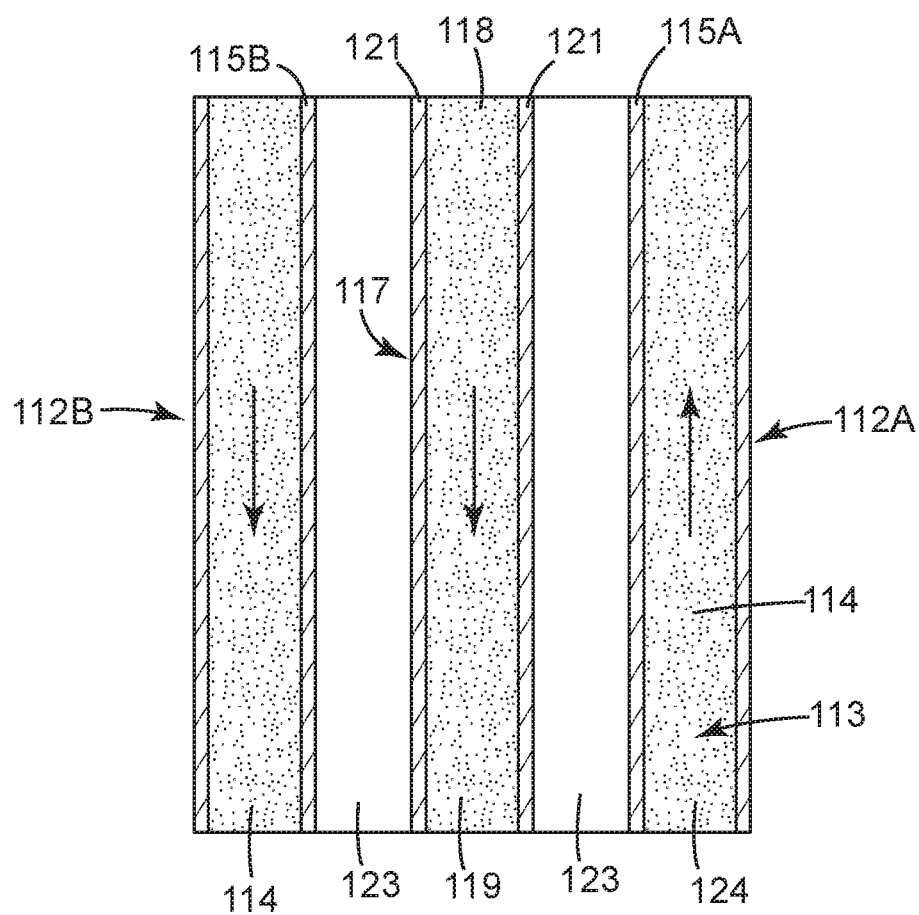
FIG. 1 illustrates a vacuumed gap membrane distillation unit.
Figure 2:
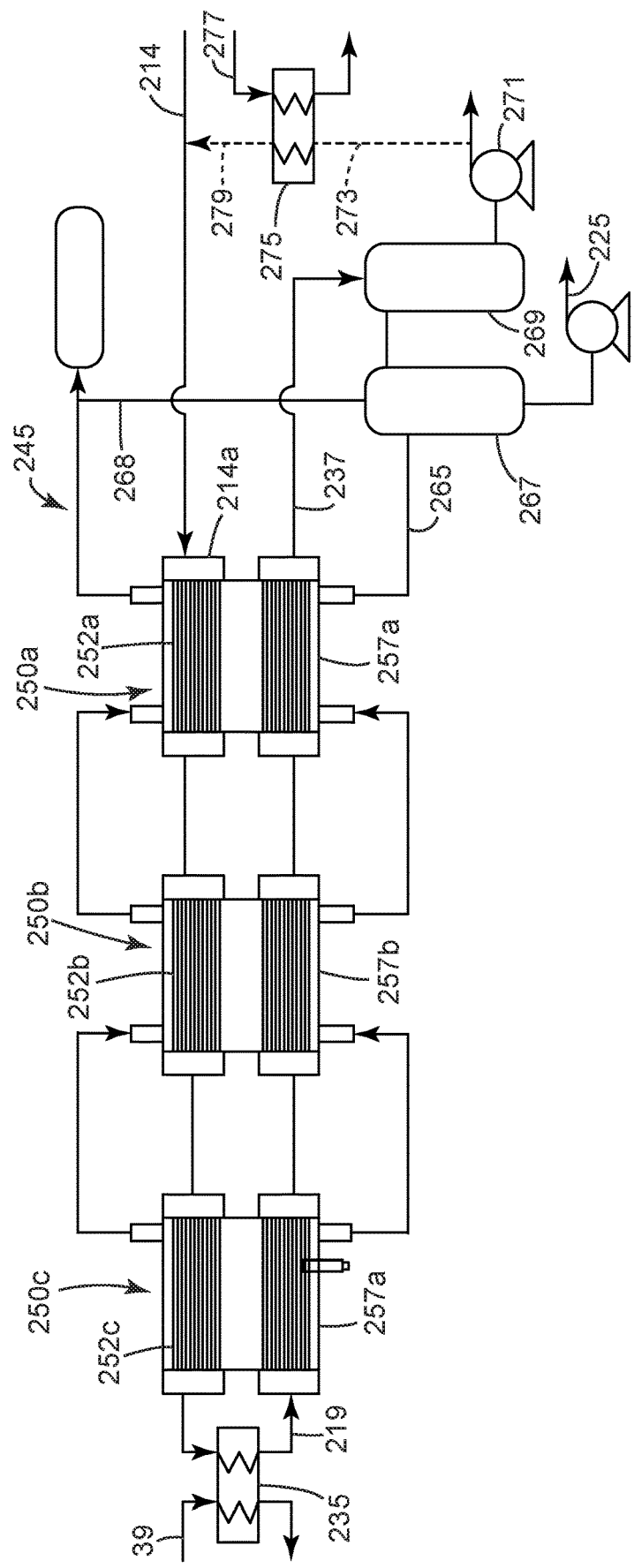
FIG. 2 illustrates a distillation system.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a membrane distillation module. A multi-effect process discussed herein can be used with other modules, not only the membrane distillation module.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a membrane distillation module has plural non-porous hollow conduits that receive a cold feed and these plural non-porous hollow conduits are located inside a porous membrane. A hot feed is provided outside and around the porous membrane. Water vapors are allowed to pass through the porous membrane and condense on the non-porous hollow conduits to generate distilled water. The distilled water is collected at the bottom of the module.

FIG. 3 shows a membrane distillation module 300 having a housing 301. The housing 301 has two chambers, a first chamber 302 that houses the hot feed 310. The hot feed 310 is received in the first chamber 302 at a hot inlet 302A and is expelled from the first chamber at a hot outlet 302B. The circulation of the hot feed 310 inside the first chamber 302 may be achieved, for example, by a pump 312. The hot feed may be originally stored in a storing tank 314. A temperature of the hot feed 310 may be in the range of 50 to 90° C. In one application, the hot feed 310 may be seawater, a brine solution, industrial waste water, produced water, brackish water and/or non-potable water to be reused. The initial temperature of the hot feed may be the ambient temperature. However, prior to being supplied to the membrane distillation module, the temperature of the hot feed need to be raised to be in the range noted above.

Inside the first chamber 302, one or more porous membranes 320 are distributed so that the membrane forms a channel that extends from one end 303A of the first chamber 302 to another end 303B. The two ends 303A and 303B of the first chamber 302 are covered by corresponding walls 322A and 322B, which hermetically seal the first chamber. In other words, there is no fluid communication between the first chamber 302 and the second chamber 304, which are separated by wall 322B, and also no fluid communication between the first chamber 302 and a third chamber 306, which are separated by the wall 322A. Note that the third chamber 306 is optional. The partition walls 322A and 322B may include a potting material.

A porous membrane 320 may be a micro-porous, hydrophobic membrane, nanocomposite membrane, surface modified membrane, dual layer composite hydrophobic/hydrophilic membrane, modified ceramic membrane, and any other membrane, coated or not, that permits the passage of water vapor but blocks the passage of water. The porous membrane 320 may include a combination of the membranes noted above. Exemplary micro-porous, hydrophobic membranes include nanofibrous membranes fabricated using electrospinning methodology, hollow fiber and flat sheet membranes fabricated using phase inversion methodology, and membrane surface modification using chemical vapor deposition (CVD), chemical treatment and plasma treatment methodologies.

In one embodiment, the porous membrane 320 extends through the partition walls 322A and 322B, to reach the second and third chambers 304 and 306. The porous membrane 320 may be shaped as a cylinder. Other shapes may be used. The porous membrane is sealed at its ends with a top layer 320A and a bottom layer 320B. The top and bottom layers 320A and 320B may be made of the same material as the porous membrane or a non-porous material (e.g., plastic, composite material, metal, etc.). Inside the porous membrane 320, one or more non-porous conduits 330 extend parallel to a longitudinal axis X of the porous membrane, as illustrated in FIG. 4. The porous membrane 320 forms an enclosure 321 (see FIGS. 4 and 5) for hosting the non-porous conduits 330. The interior of the enclosure 321 is filled with air 324 and vapors 326, as shown in FIG. 5. Note that the hot feed flows outside the porous membrane 320, i.e., the hot feed contacts an outside surface 320C (see FIGS. 4 and 5) and at no time enters inside the enclosure 321. Only the vapors 326 resulting from the hot feed can enter inside the enclosure 321, through the porous membrane 320. As shown in FIG. 4, the vapors 326 condense on the exterior surface of the one or more conduits 330, become water droplets 328, and then fall due to gravity, through holes 340 formed in the bottom layer 320B, in the second chamber 304. The distilled water 328 accumulates in the second chamber 304 (see FIG. 3), from which it is collected with a water pump 344 and stored in water tank 346.

Each conduit 330 may be shaped as a cylinder and can be made of any material. In one embodiment, the conduits 330 are made of a polymeric heat exchanger hollow fiber. A cold feed 350, which is stored in a tank 352, is pumped with a pump 354 through each of the one or more conduits 330 as shown in FIG. 3. The purpose of the cold feed 350 is to condensate the vapors 326 to form the water droplets 328 as illustrated in FIG. 4. As shown in FIG. 4, the hot feed 310 flows around and outside the porous membrane 320 while the cold feed 350 flows inside each non-porous conduit 330.

Figure 6:
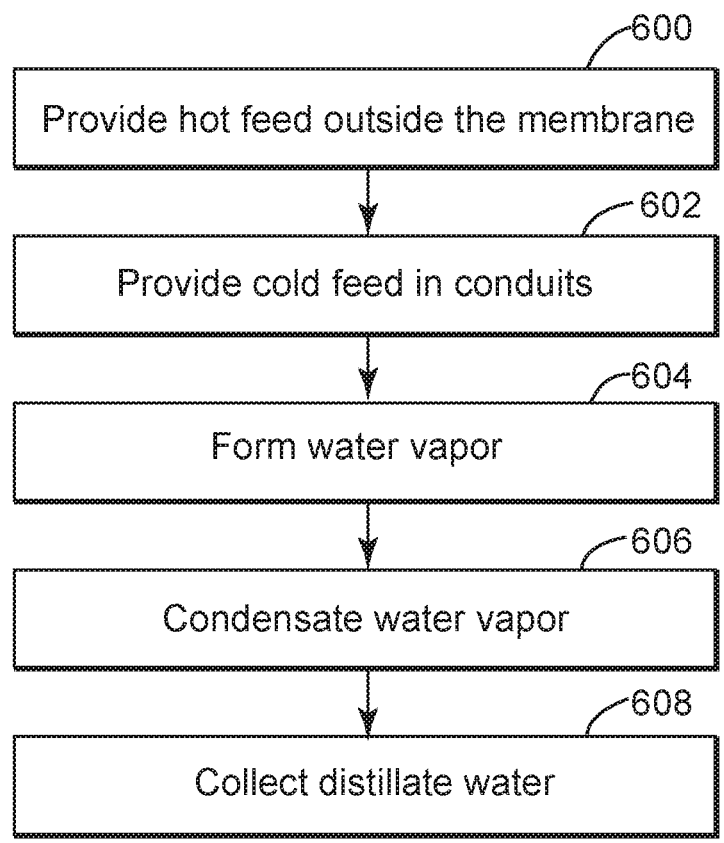
FIG. 6 is a flowchart of a method for generating a distillate using a membrane distillation module.

This arrangement, when in operation, works as now discussed with regard to FIG. 6. In step 600, a hot feed is provided at a hot inlet 302A of the membrane distillation module 300. The hot feed 310 moves through a first chamber 302 of the housing 301 and exits at the hot outlet 302B. In step 602, the cold feed 350 moves through an interior of the one or more conduits 330, from one end to the other. While the hot feed 310 moves from one end 303B of the first chamber 302 to another end 303A, along the exterior of the porous membrane 320, cold feed 350 moves in an opposite direction (see FIG. 4) through the conduits 330. Due to the difference in temperatures between the two concentric surfaces of the porous membrane 320 and the non-porous conduits 330, water vapor 326 is formed in step 604 in the hot feed 310 and the water vapor is transferred from outside the porous membrane 320 into the enclosure 321 of the membrane, towards the cold surface of the non-porous conduits 330, as also shown in FIG. 4. In step 606, the vapors 326 condensate on the surfaces of the non-porous conduits 330 and the accumulated condensate 328 on these surfaces is transferred in step 608 to the second chamber 304, (i.e., the distillate compartment) by gravity or vacuum, if the latter is applied.

Figure 7:
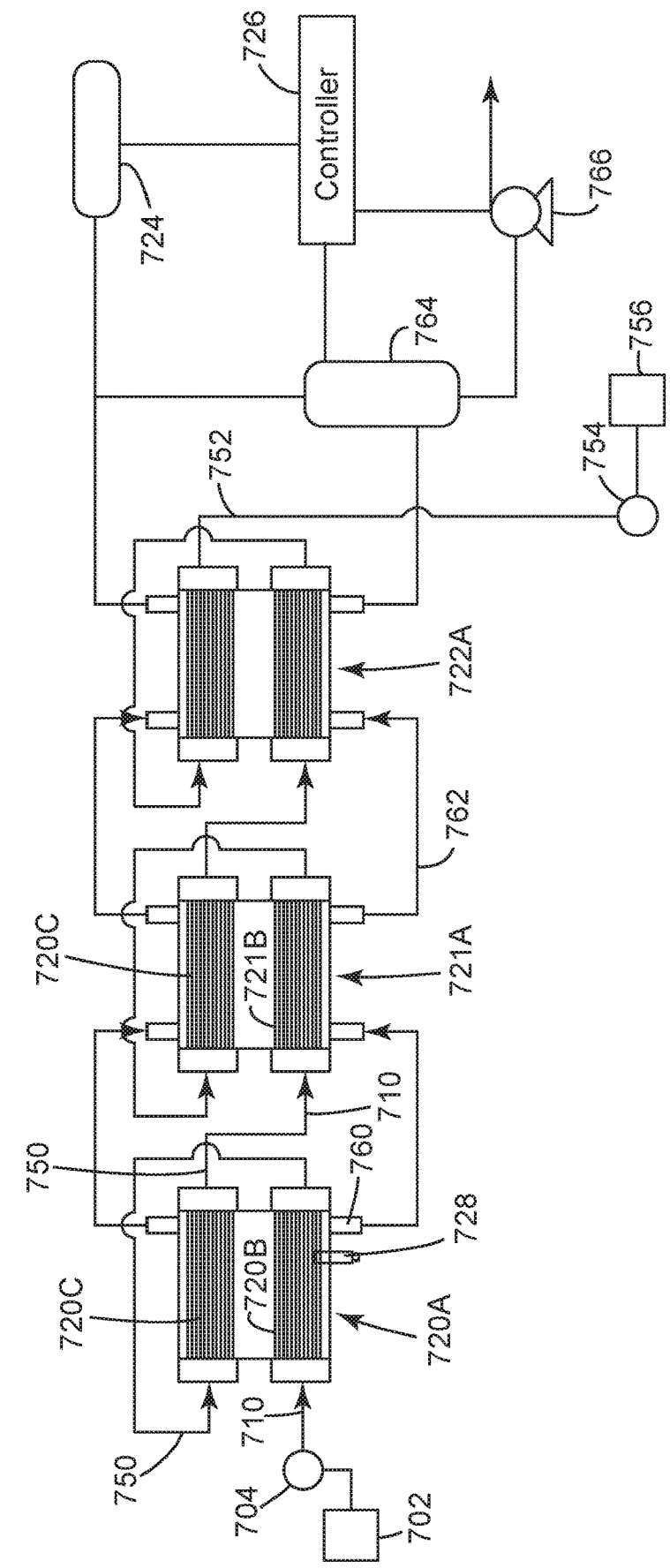
FIG. 7 illustrates a distillation system in which at least one distillation module uses an output of the evaporation part as a coolant for its condensation part.

One skilled in the art would understand that the membrane distillation module 300 may be used in series/parallel with other modules for improving the efficiency of the distillation process. One such configuration that uses plural membrane distillation modules is now discussed with regard to FIG. 7. FIG. 7 shows a distillation system 700 having six different membrane distillation modules. One skilled in the art would understand that less or more modules may be used. Also, the modules may be the module 300 discussed above, the module 100 discussed with regard to FIG. 1, or other modules.

Distillation system 700 includes a hot feed tank 702 that stores the hot feed 710. The hot feed 710 may have a temperature between 50 to 90° C. The hot feed 710 is pumped with a hot feed pump 704 to the first membrane distillation module 720A, where the evaporation process is initiated because of the low pressure maintained by a vacuum system 724. In this regard, a controller 726 is connected to the vacuum system 724 and controls an interior pressure of the membrane distillation modules so that, a quick evaporation of the water from the water feed takes place. In one application, temperature sensors 728 (only one shown for simplicity) may be present inside the evaporation and/or condensation parts of the membrane distillation modules to measure the local temperature. The controller then calculates the correct internal pressure for obtaining a rapid evaporation of the water for the given temperature conditions. While the temperature inside the evaporation and condensation parts are not actively controlled in this embodiment by the controller 728, the pressure inside these parts is actively controlled through the vacuum system 724 (e.g., vacuum pump).

The evaporation process causes a drop in the hot feed water's temperature and this drop is expected to be in the range of 3-5° C. Such a drop in the hot feed water's temperature makes the hot feed water a suitable candidate for the cold feed water (i.e., a cooling medium for the vapor condensation phase). Therefore, the hot feed water 710, after exiting the evaporation part 720B of the first membrane distillation module 720A, enters in the coolant channel (as the cold feed water 750) of the condensation part 720C of the module 720A, in a co-current regime. In this way, the heat that has been lost due to evaporation in the evaporation part 720B is partially regained during the condensation process in the condensation part 720C, in each module 720.

Thus, after the cold water feed 750 exits the coolant channel of the first module 720A, it enters as a hot water feed 710 into the evaporation part 721B (including, for example, the porous membrane channel) of an internal module 721A and the same cycle is repeated using several internal modules 721A. By using multiple modules 721A in series, the water feed should exit the last module 722A as a concentrated brine 752 at at low temperature (around 30° C.). The concentrated brine 752 is pumped by pump 754 to a storage tank or another distillation module 756.

Water distillate 760 from each module is collected through piping 762, where the difference in pressure between the various modules has enough driving force to transfer all the distillate to the collection product tank 764. The vacuum inside the modules is adjusted by the controller 726 to the saturation pressure of the water feed's temperature to assure full removal of all non-condensable gases from all modules. A pump 766 can either extract the distillate 762 from the distillation modules and store it into the tank 764, or pump the distillate to another processing device.

Figure 8:
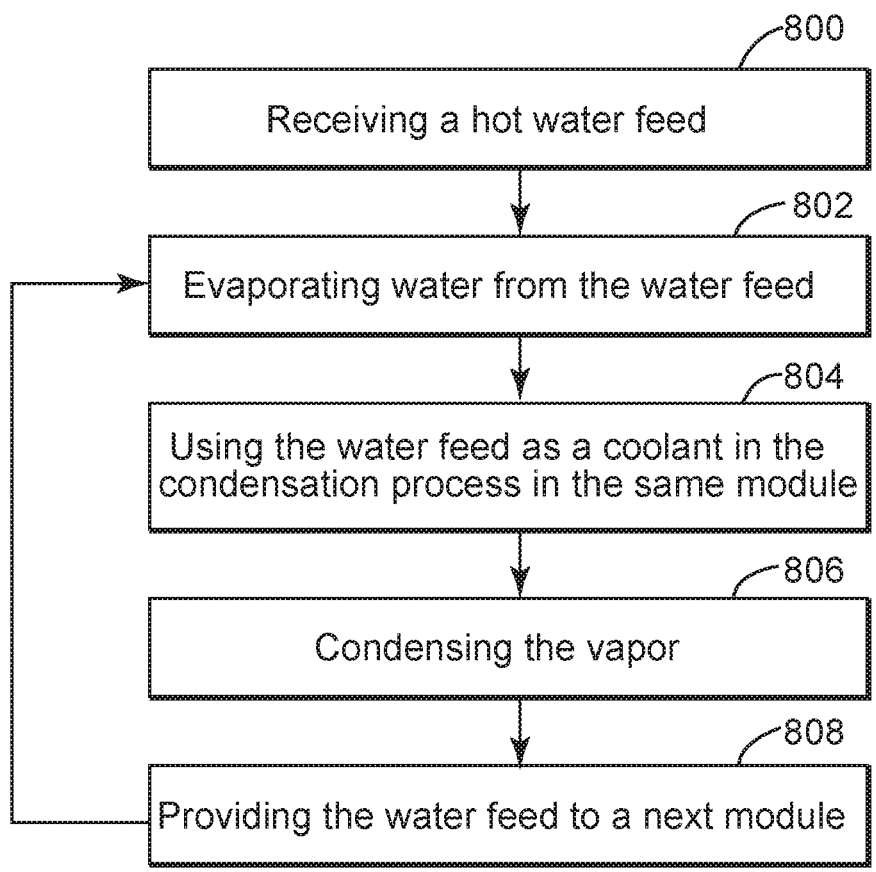
FIG. 8 is a flowchart of a method for generating distilled water with a multi-stage distillation system.

A method for producing a distillate (e.g., water) with the distillation system 700 is now discussed with regard to FIG. 8. The method includes a step 800 of receiving a hot water feed 710. The hot water feed 710 may originate from many sources, as already discussed above with regard to the embodiment of FIG. 3. The hot water feed 710 enters the evaporation part of a first module 720A and in step 802, water is evaporated from the hot water feed 710. Then, the remaining hot water feed is routed (supplied) in step 804 to the condensation part of the same module 720A, to be used as a coolant. In step 806, the vapor obtained from the evaporation part of the module 720A is condensed, in the same module, to form the distillate. Thus, in this method, the water feed is used first for the evaporation process and then is used for the condensation process in the same module. Only after the water feed has been used in the same module for both the evaporation and condensation processes, the water feed is provided in step 808 to a next module for repeating the same cycle (i.e., steps 802 to 808).

The disclosed embodiments provide methods and devices that evaporate water from a hot water feed and generate distilled water. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A membrane distillation module comprising:
a housing having first and second adjacent chambers, with no liquid communication between the first and second chambers, the first chamber having a hot inlet for receiving a hot feed and a hot outlet for expelling the hot feed, and the second chamber is configured to collect a distillate formed on a non-porous conduit;
a porous membrane located inside the housing and having an outside surface that defines an enclosure, the outside surface being configured to contact the hot feed, wherein the porous membrane is configured to prevent the hot feed from passing from outside the porous membrane to an inside of the enclosure; and
the non-porous conduit located inside the enclosure, the non-porous conduit having a side surface, an inlet for receiving a cold feed and an outlet for expelling the cold feed, the inlet and the outlet being located outside the first chamber,
wherein an entirety of the side surface of the non-porous conduit is separated from the porous membrane by an air gap, and
wherein each of the porous membrane and the non-porous conduit partially extends within the first chamber and partially extends within the second chamber.

2. The module of claim 1, wherein the porous membrane forms a channel that extends inside a first chamber formed inside the housing.

3. The module of claim 2, wherein the non-porous conduit extends parallel to the channel formed by the porous membrane.

4. The module of claim 2, wherein the first chamber is separated from the second chamber by a bottom wall.

5. The module of claim 4, wherein the bottom wall has holes that allow the distillate formed on an exterior surface of the non-porous conduit to gather inside the second chamber.

6. The module of claim 4, wherein the hot feed enters only the first chamber and the cold feed enters only inside the non-porous conduit.

7. The module of claim 1, further comprising:
additional non-porous conduits located inside the enclosure of the porous membrane.

8. The module of claim 7, wherein there is an air gap between the non-porous conduit and the additional non-porous conduits.

9. The module of claim 7, wherein vapors from the hot feed pass through the porous membrane and enter an air gap between the non-porous conduit and the additional non-porous conduits, and the vapors condense on the non-porous conduit and the additional non-porous conduits.

10. A distillation system for generating a distillate, the system comprising:
a first distillation module that receives a hot feed at an evaporation part;
intermediate distillation modules that receive the hot feed from the first distillation module; and
a last distillation module that receives the hot feed from the intermediate distillation modules,
wherein at least the first distillation module uses an output feed of the evaporation part as a coolant for a condensation part of the first distillation module, and
wherein the intermediate distillation module comprises:
a housing having first and second adjacent chambers, with no liquid communication between the first and second chambers, the first chamber having a hot inlet for receiving the hot feed and a hot outlet for expelling the hot feed, and the second chamber is configured to collect a distillate formed on a non-porous conduit;
a porous membrane located inside the housing and having an outside surface that defines an enclosure, the outside surface being configured to contact the hot feed, wherein the porous membrane is configured to prevent the hot feed from passing from outside the porous membrane to an inside of the enclosure; and
the non-porous conduit located inside the enclosure, the non-porous conduit having a side surface, an inlet for receiving a cold feed and an outlet for expelling the cold feed, the inlet and the outlet being located outside the first chamber,
wherein an entirety of the side surface of the non-porous conduit is separated from the porous membrane by an air gap, and
wherein each of the porous membrane and the non-porous conduit partially extends within the first chamber and partially extends within the second chamber.

11. The system of claim 10, wherein each distillation module uses a corresponding output feed from an evaporation part as a coolant for a condensation part of the same distillation module.

12. The system of claim 10, further comprising:
a controller that adjusts a pressure inside each distillation module so that the pressure is equal to the saturation pressure of the feed.

* * * * *